United States Patent
Cortez et al.

(10) Patent No.: US 7,516,968 B2
(45) Date of Patent: Apr. 14, 2009

(54) WISHBONE-SHAPED LINKAGE COMPONENT AND SUSPENSION SYSTEMS INCORPORATING THE SAME

(75) Inventors: Jerome Lim Cortez, Tinley Park, IL (US); Rodolfo Rosales, Aurora, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 323 days.

(21) Appl. No.: 11/118,096

(22) Filed: Apr. 29, 2005

(65) Prior Publication Data

US 2006/0244232 A1 Nov. 2, 2006

(51) Int. Cl.
*B60G 9/02* (2006.01)
(52) U.S. Cl. .................. 280/124.116; 280/124.128; 280/124.157; 280/124.153; 280/124.109
(58) Field of Classification Search .......... 280/124.106, 280/124.116, 124.128–124.133, 124.153, 280/124.156, 124.109
See application file for complete search history.

(56) References Cited

U.S. PATENT DOCUMENTS

| | | | | | |
|---|---|---|---|---|---|
| 2,180,860 | A | * | 11/1939 | Brown | 267/64.23 |
| 4,415,179 | A | * | 11/1983 | Marinelli | 280/124.116 |
| 5,549,320 | A | * | 8/1996 | Ellingsen | 280/124.116 |
| 5,649,719 | A | * | 7/1997 | Wallace et al. | 280/124.156 |
| 6,527,286 | B2 | * | 3/2003 | Keeler et al. | 280/124.135 |
| 6,609,764 | B2 | | 8/2003 | Dudding et al. | |
| 6,616,156 | B1 | | 9/2003 | Dudding et al. | |
| 7,350,792 | B1 | * | 4/2008 | Garman | 280/93.51 |
| 2006/0170175 | A1 | * | 8/2006 | Platner et al. | 280/124.106 |

FOREIGN PATENT DOCUMENTS

DE 43 38 651 A * 3/1995
EP 0430 368 A * 6/1991

* cited by examiner

*Primary Examiner*—Ruth Ilan
(74) *Attorney, Agent, or Firm*—Cook Alex Ltd.

(57) ABSTRACT

A four-point wishbone-shaped linkage is disclosed for use in a suspension system. The wishbone-shaped linkage includes a base and two limbs extending away from the base creating a large mouth open area between the limbs and base. The base includes a bar and bushing assembly extending laterally therethrough. Also disclosed are suspension systems incorporating the four-point wishbone-shaped linkage. The suspension system connects an axle to a vehicle chassis having a first frame member and a second frame member extending longitudinally on opposite sides of the chassis, respectively. The first and second frame hangers are mounted to the first and second frame member, respectively, a cross member connects the first and second frame hangers and the wishbone-shaped linkage is pivotally connected to the axle seats mounted to the axle and to the cross member. The suspension system also can include air springs, shock absorbers and torque rods.

45 Claims, 4 Drawing Sheets

WISHBONE-SHAPED LINKAGE COMPONENT AND SUSPENSION SYSTEMS INCORPORATING THE SAME

BACKGROUND OF THE INVENTION

This invention is directed to vehicle suspension systems, and to linkage suspensions incorporating a unique linkage component. More particularly, the invention is directed to a four-point wishbone-shaped linkage suspension component and suspension systems incorporating a four-point wishbone-shaped linkage. This four-point wishbone-shaped linkage in combination with other suspension system components improves vehicle handling, axle control, ride comfort and cargo protection while minimizing the complexity, package space and weight of the suspension system.

Suspension systems suspend the vehicle chassis over the axle of the vehicle and absorb axle movement caused by the wheels encountering obstacles, holes and uneven road surfaces. Axle movement occurs not only when the wheels encounter obstacles in the road but also during acceleration and braking and during cornering (when the vehicle makes turns). In these situations, it is required that the suspension system provides stability to the vehicle by controlling axle movement.

Suspension systems utilize several different components in various configurations to control the range of axle motions. Leaf springs or beams are widely used components of suspension systems and play a major role in controlling certain axle motions. Leaf springs however, are expensive to manufacture and assemble, add significant weight to the suspension, and add to the overall complexity of the suspension when used in conjunction with a stabilizer bar for additional roll stability to achieve a desired vertical spring rate in a given suspension packaging envelope. When optimizing for ride comfort, a low vertical spring rate is desirable, however roll stability usually suffers especially in leaf spring suspension systems. Primary roll stiffness is directly proportional to the vertical spring rate of leaf spring suspensions. Therefore in order to provide the desired ride comfort characteristics, an auxiliary roll stiffness mechanism such as a stabilizer bar must be employed, which adds both cost and weight. Reducing the weight of the suspension system translates into higher payload capacity, in the case of commercial vehicles, and/or lowers fuel costs. U.S. Pat. No. 6,527,286, which is hereby incorporated by reference herein, discloses suspension systems that do not employ leaf springs. In the suspension systems disclosed by Keeler et al., the pair of leaf springs—one on each side of the axle—is replaced by a fabricated torque box along with other components.

While replacing the pair of leaf springs with a torque box can be readily accomplished in rear, tandem or trailer axles, there are issues unique to the front steering axle that makes incorporating the torque box configuration more difficult in steering axle suspension systems. First, there are packaging constraints. The space above and around the steering axle is typically occupied by the engine, cooling systems, and oil pan sump, among other things. This leaves limited space for the torque box, especially considering that the torque box will move up and down in conjunction with the axle.

Another issue relates to the kinematics involved in the steering axle. Assuming a torque box could be incorporated in a steering axle suspension system, there may be undesirable steering kinetics. For example, in a leading arm arrangement where the torque box is connected to the steering axle and frame and where the axle is ahead of the torque box linkages, the compliant nature of the bushing and bar arrangement of the torque box could cause an undesirable over-steer effect. Over-steer is when the vehicle turns into the bend or corner the driver is attempting to negotiate more than what was desired or expected. Under-steer effect is the opposite in that the vehicle does not turn into the bend as much as anticipated forcing the driver to take additional steering action to turn the vehicle. An under-steer condition is more desirable and safer than an over-steer condition since the driver feels more in control of the vehicle and since over-steer could contribute to a dangerous rollover condition.

In view of the forgoing, it is desirable to reduce the cost, weight and complexity of steering axle suspension systems. In particular, it would be desirable to replace the leaf spring components employed in many suspension systems while improving or at least not negatively affecting the performance of the suspension system. In addition, it would be desirable to provide a suspension assembly for steering axles having the benefits of a torque box configuration but without the adverse effects on steering kinetics that a torque box may cause. It would also be desirable to design such a suspension that fits within packaging limitations of the vehicle. Moreover, it would be desirable to provide a linkage component for use in a steering axle suspension assembly considering the limited packaging space around the steering axle. Furthermore, it would desirable if the linkage could also be used as a component of non-steering axle suspension systems.

The benefits of the preferred forms of the novel subject matter set forth herein will become apparent from the following description. It will be understood, however, that an apparatus could still appropriate the invention claimed herein without accomplishing each and every one of those benefits gleaned from the following description. The appended claims, not the benefits of the novel subject matter set forth herein, define the subject matter protected by law. Any and all benefits are derived from the preferred forms of the invention, not necessarily the invention in general.

SUMMARY OF THE INVENTION

In one aspect of the present invention, a suspension system is provided for supporting a first longitudinally extending frame member on a first side of a chassis and a second longitudinally extending frame member on a second side of said chassis. The first frame member is positioned adjacent to a first end of a laterally extending axle and the second frame member is positioned adjacent to a second end of the axle. In addition, the first frame member has a first hanger mounted thereto and the second frame member has a second hanger mounted thereto. A cross member is mounted to the first frame hanger and to the second frame hanger. Furthermore, the suspension system includes a wishbone-shaped linkage component connected to the axle and cross member.

In another aspect, a steering axle suspension system is provided for a vehicle chassis having a first longitudinally extending frame member on a first side of the chassis and a second longitudinally extending frame member on a second side of the vehicle chassis. The suspension system supporting the vehicle chassis is secured to a steering axle extending laterally across the vehicle chassis. In addition a first hanger is mounted to the first frame member and a second frame hanger is mounted to the second frame member. Also, a cross member is mounted to the first and second frame hangers, and a wishbone-shaped linkage component is pivotally connected to the cross member and steering axle.

In yet another aspect, a wishbone-shaped linkage component for pivotally connecting an axle to a vehicle chassis is provided. The wishbone-shaped linkage includes a base and first and second limbs extending longitudinally and laterally away from the base in a manner giving the linkage component a wishbone-like shape. The first and second limbs define a wide mouth or an open space between them. The base also has a lateral width W and a longitudinal length X. In addition, the first and second limbs extend longitudinally away from the base by length Z and are laterally spaced from each other by width Y. Furthermore, width Y is at least one and one-half as great as width W, and length Z is at least twice as great as length X.

BRIEF DESCRIPTION OF THE DRAWINGS

In the following detailed description, reference will frequently be made to the following views of the drawing, in which like reference numerals refer to like components, and in which.

DETAILED DESCRIPTION OF THE INVENTION

Figure 1:
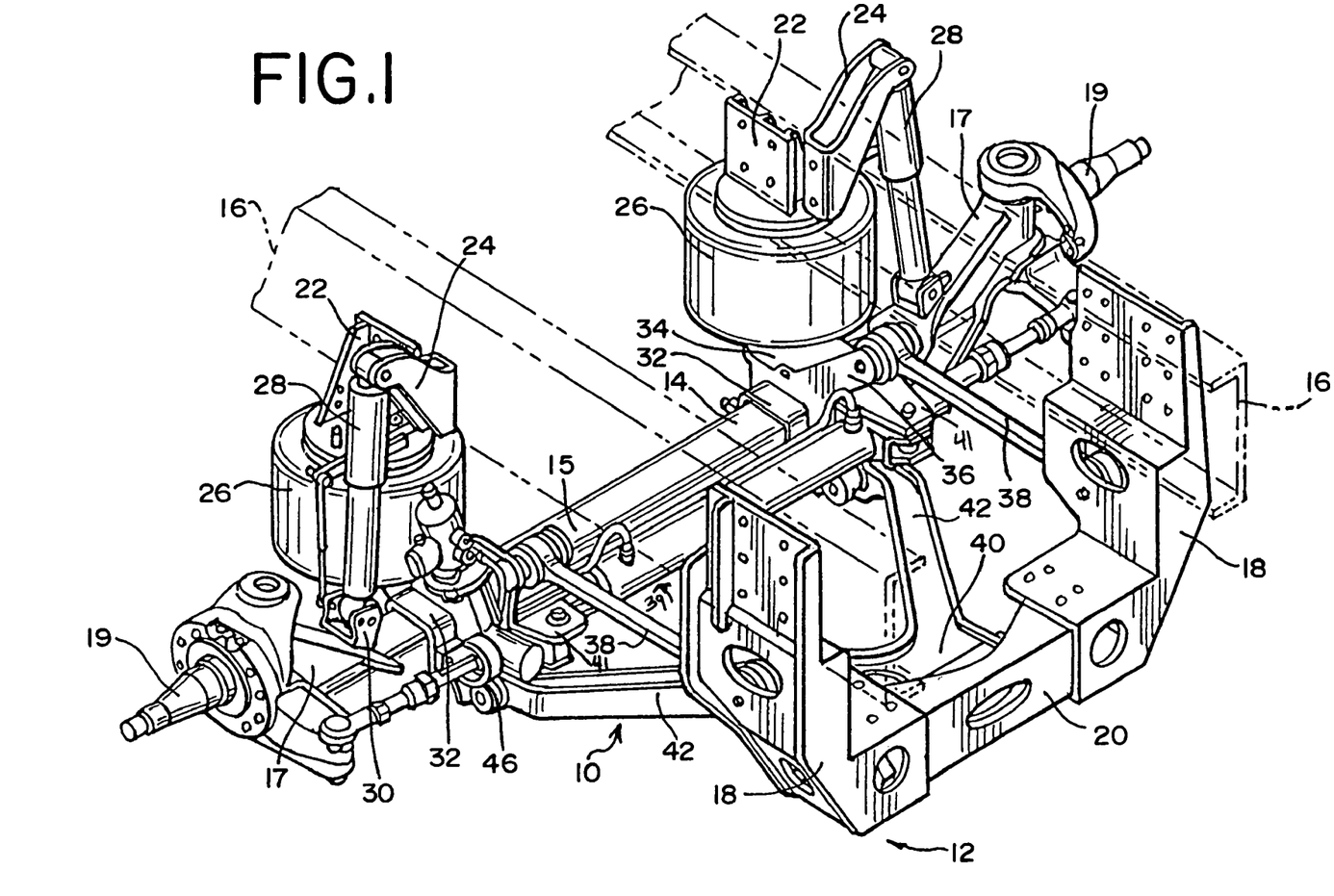
FIG. 1 is perspective view of a suspension system designed in accordance with principles of the present invention.

Referring to the drawings, particularly FIG. 1, a four-point wishbone-shaped linkage 10 is employed in a suspension system 12. As illustrated, the construction of the suspension system 12 on one side of the vehicle is duplicated on the opposite side of the vehicle.

The suspension system 12 connects the axle 14 to the longitudinally extending vehicle frame members 16 which are on opposite sides of a vehicle chassis. The axle 14 includes a midsection 15 and upwardly inclined portions 17 at opposite ends of the axle 14. Details of the construction of the axle 14 are described in U.S. Pat. No. 6,609,764 (Dudding, et al.), the disclosure of which is hereby incorporated herein by reference. A spindle 19 is used with a steering knuckle for mounting the wheels to the axle 14. The steering knuckle is connected to the axle by a king pin in a known manner. Preferably, the spindle and steering knuckle embody one of the forms described in U.S. Pat. No. 6,616,156 (Dudding, et al.).

The suspension system 12 absorbs the movement of the axle 14 when the wheels encounter obstacles and/or uneven road surfaces and maintains the vehicle chassis at a relatively constant height. This provides a smoother and more comfortable ride for the passenger(s). Besides cushioning the ride, the suspension system 12 also functions to control the lateral and longitudinal movement of the axle in addition to providing roll stiffness, which allows for improved handling of the vehicle.

A frame hanger 18 is connected to each frame member 16 and a cross member 20 is mounted to the two frame hangers 18 at its respective ends. As illustrated in FIG. 1, the preferred frame hangers 18 and cross member 20 are structured to have anti-dive geometry, which reduces bottoming during braking.

Longitudinally spaced from the frame hangers 18 are air spring mounting brackets 22 and shock absorber mounting brackets 24, which permit air springs 26 and shock absorbers 28, respectively, to be attached to the frame members 16. In particular, the shock absorber mounting brackets 24 are attached to the frame members 16 at a location directly above the axle 14. The upper ends of the shock absorbers 28 are pivotally connected to their associated shock absorber mounting bracket 24, and the lower ends of the shock absorbers are pivotally connected to the axle 14 via their associated fastener 30. This preferred outboard mounting provides for improved axle control. Preferably, shock absorbers 28 can be tuned for enhanced ride and handling.

The air spring mounting brackets 22 are connected to the frame members 14 at a location above and ahead of the axle 14. However, the placement of the brackets at this position is dependent on the configuration of the suspension system, i.e. leading arm or trailing arm configuration, which will be discussed in more detail below. The upper ends of the air springs 26 are attached to their associated air spring mounting brackets 22. The lower ends of the air springs 26 are connected to axle seats 32, which in turn are connected to the axle 14. Axle seats 32 are positioned inwardly of the upwardly extending portions 17 of the axle. Each axle seat 32 includes a forwardly extending platform 34 for mounting the air springs 26.

Preferably the air springs 26 are large volume, direct acting air springs with very low spring rates in the order of about nine hundred lbs/in for a twelve thousand pound capacity axle. The vertical spring rate should be tuned to the capacity of the axle and should target as low a natural frequency as possible, or approximately one and one-tenth hertz or lower. In addition, it is preferred that the air springs 26 have capacities of about ten thousand to about twenty thousand pounds. Furthermore, it is preferred that air springs 26 have from about three to about five inches of jounce and rebound travel, more preferably about four inches of jounce and rebound travel. These preferred air springs 26 are able to support the entire load while providing improved ride comfort.

Each axle seat 32 also includes a pair of arms 36 for pivotally connecting torque rods 38 to the axle. In particular, arms 36 extend upwardly and towards the rear of the vehicle. Moreover, the axle seats 32 are designed so that platforms 34 and arms 36 extend in opposite directions. The torque rods 38 could alternatively be pivotally connected to the axle 14 without using the axle seat arms. In the arrangement illustrated, it will be understood that the opposite ends of the torque rods 38 have openings (not shown). The ends of arms 36 also include openings (not shown). One end of the torque rod 38 is positioned between the openings of the arms so that the opening in the torque rod aligns with the openings of the arms to receive a bolt, pin or other fastener to pivotally connect the torque rod 38 to the arms 36. Bushings can be placed around the bolt or pin, and/or washers can be placed between the torque rod 38 and the arms 36. The opposite end of the torque rod 38 is pivotally connected to its associated frame hanger 18 in a similar arrangement. Preferably, torque rods 38 are optimized for durability and weight reduction.

A four-point wishbone-shaped linkage 10 of the present invention is pivotally connected to the axle 14 and cross member 20. Wishbone-shaped linkage 10 includes a base 40 and two laterally and longitudinally extending limbs 42. The base includes a bar and bushing assembly 43 having bar 44 and bushing 45, which assembly extends laterally through the base. This is more clearly shown in the wishbone-shaped linkage shown in FIGS. 2 and 3.

Figure 2:
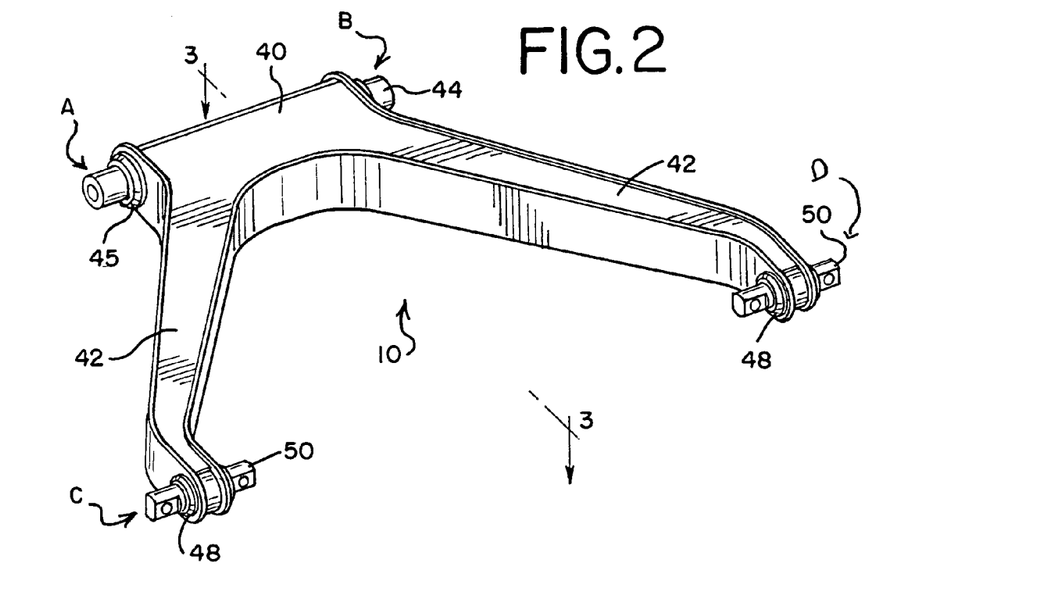
FIG. 2 is a perspective view of a wishbone-shaped linkage component designed in accordance with principles of the present invention.

The wishbone-shaped linkage 10 is referred to as a four-point linkage since it is attached at four positions. As shown in FIG. 2, there are two linkages, A and B, at the base 40 and one linkage each, C and D, at the distal end portions of limbs 42. The four-point wishbone-shaped linkage uses four attachment points to control the longitudinal and lateral position of the axle. In addition, while prior art suspension systems usually require a stabilizer bar to provide auxiliary roll stiffness, suspension systems of the present invention do not require use of a stabilizer bar because the wishbone-shaped linkage provides auxiliary roll stiffness as one of its functions.

Figure 3:
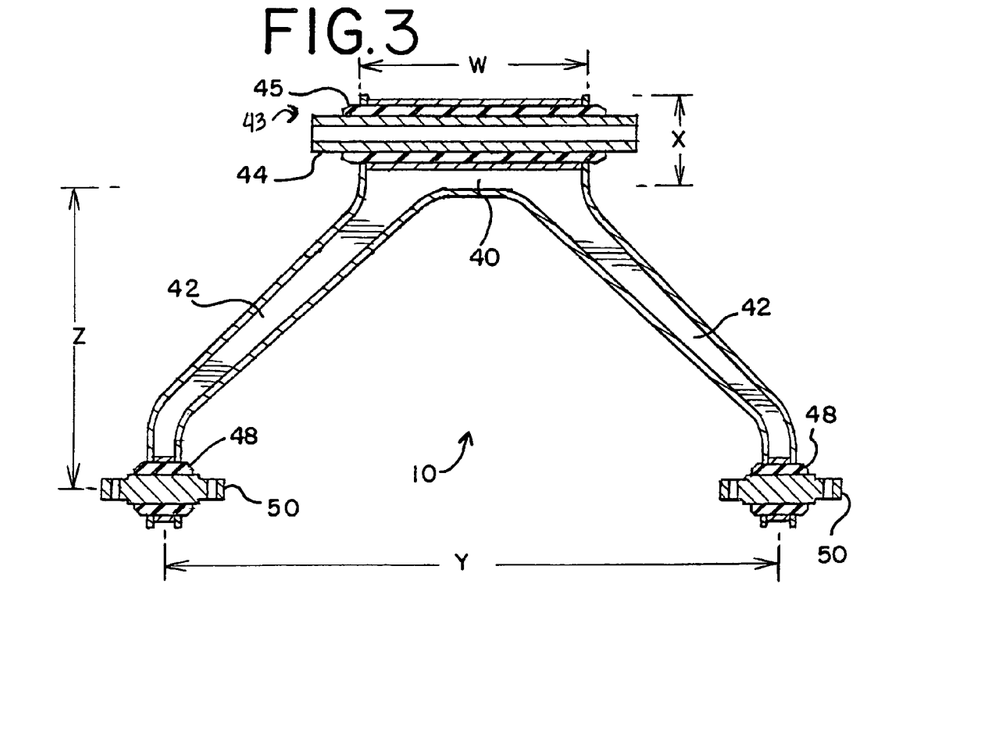
FIG. 3 is a cross-sectional view taken at line 3-3 of FIG. 2.

As illustrated, the base 40 of wishbone-shaped linkage 10 is pivotally connected to the cross member 20 by the bar and bushing assembly 43 as more clearly shown in FIGS. 2 and 3. Preferably, as shown in FIGS. 2 and 3, a compliant bushing 45 is placed in an opening that extends through the base 40 and surrounds bar 44 along its length except for the outermost extremities of the bar 44. The bar 44 is then pivotally connected to cross member. This orientation of the base 20 being connected to the cross member 20 is referred to as the base-to-cross member connection. The pivotal connection is more clearly shown in FIG. 6. However, it is to be noted that the base 340 of wishbone-shaped linkage 310 is pivotally connected to the axle 314 in suspension system 312 shown in FIG. 6. This wishbone-shaped linkage orientation in suspension system 312 is referred to as base-to-axle connection. Since the cross member is typically in a higher position relative to the axle, the wishbone-shaped linkage is inclined. Consequently, these wishbone-shaped linkage orientations also affect the location of the roll center for the suspension.

At the other end of wishbone-shaped linkage 10, limbs 42 are pivotally connected to the axle 14. In suspension system 12, for example, a clevis 46 extends rearward from each axle seat 32 to engage a limb 42. A bolt, pin or other fastener (not shown) in lieu of the pin 50 and bushing 48 shown in FIGS. 2 and 3 is passed laterally through aligned openings in the clevis 46 and limb 42 to complete the pivotal connection. Alternatively, the limbs 42 can be pivotally connected to the axle 14 without the use of an axle seat connection point. Among the many advantages, the wishbone-shaped linkage reacts to multi-axial loading.

Figure 6:
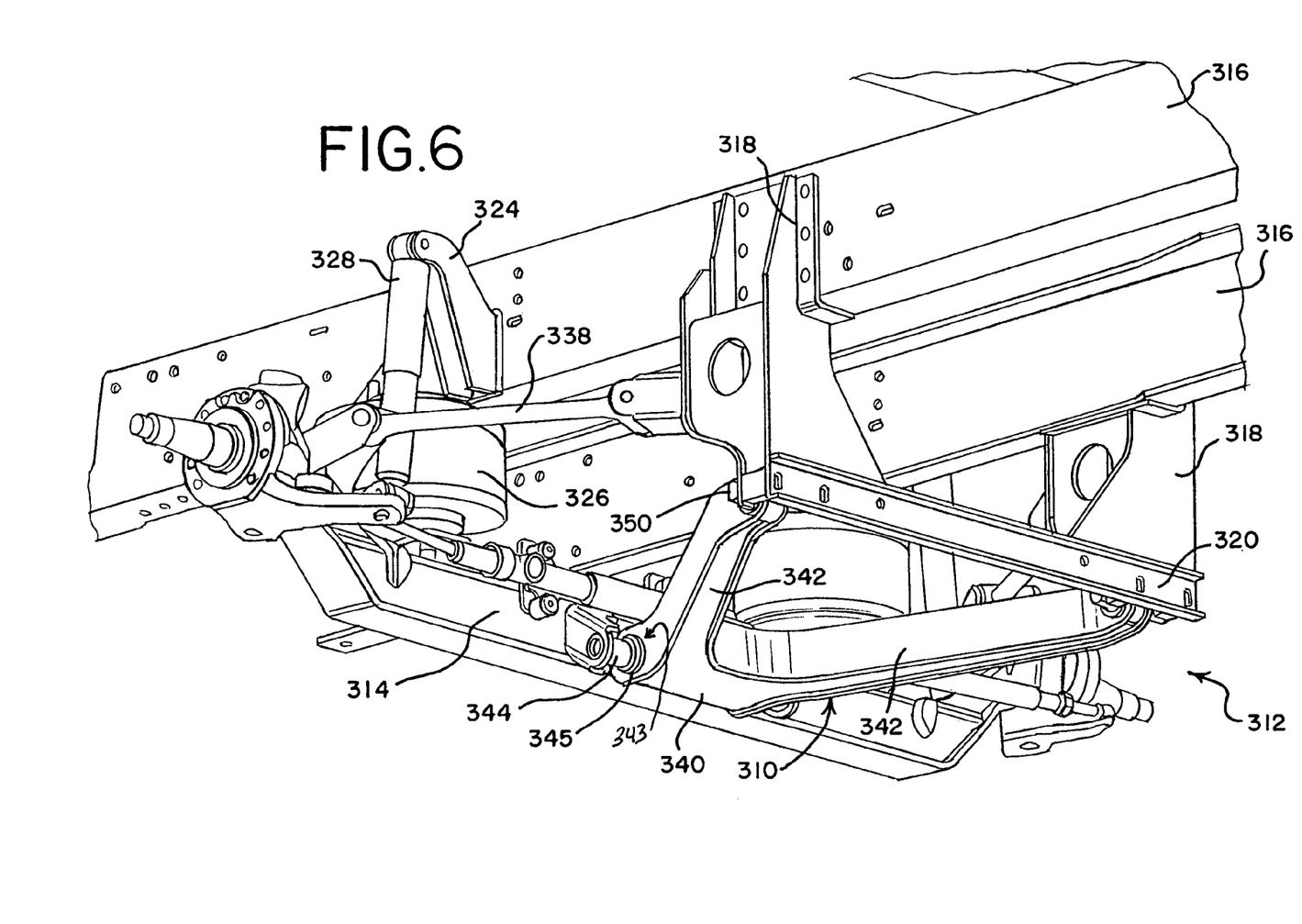
FIG. 6 is a perspective view of still another suspension system designed in accordance with principles of the present invention.

A compliant bushing 48 can be placed in the openings of limbs 42 to surround the pins 50 as shown in FIG. 2 and FIG. 3. However, in leading arm configurations represented by suspension systems 12 and 312 (see FIG. 6) a compliant bushing is preferably not used because undesirable over-steer may result. In such leading arm configuration suspension systems, the pivotal connection of the limbs should preferably utilize a pin or bolt or other similar fasteners without a compliant bushing or alternatively utilize a noncompliant bushing such as a metal sleeve, regardless of whether the limbs are pivotally connected to the axle such as in suspension system 12 (FIG. 1) or to the cross member as in suspension system 312 (FIG. 6).

Preferably, the bushing 45 is maintenance-free and designed for long life. The bar and bushing assembly 43 preferably allows for tuning of the roll stiffness of the wishbone-shaped linkage, preferably from about twenty seven thousand to sixty thousand in-lbs/deg, however this can be tuned as desired. In addition, the bar and bushing assembly 43 preferably provides high lateral stiffness in the order of greater than about fifteen thousand lbs/in, however this also can be tuned, as desired.

Suspension system 12 is also configured to integrate a rack and pinion steering system 39 onto a solid beam axle. Preferably, axle seats 32 include attachment brackets 41 connecting the rack and pinion steering system 39 to the axle.

As more clearly shown in FIGS. 2 and 3, the two limbs 42 of the wishbone-shaped-shaped linkage 10 are amply separated from each other and extend away from the base considerably leaving a relatively large mouth or open area. More specifically, the lateral width Y of limbs 42 measured from the centers of the limbs 42 is appreciably greater than the lateral width W of the base 40, and the longitudinal length Z of limbs 42 is appreciably greater than the longitudinal length X of the base 40. Preferably, width Y is greater than length Z and greater than width W. More preferably, width Y is at least one and one-half the length Z and at least double width W.

The small footprint of the base 40 also permits a large open space. More specifically, base width W is greater than longitudinal base length X and less than length Z. Preferably, base width W is twice base length X, and length Z is preferably about three times greater than base length X.

Figure 4:
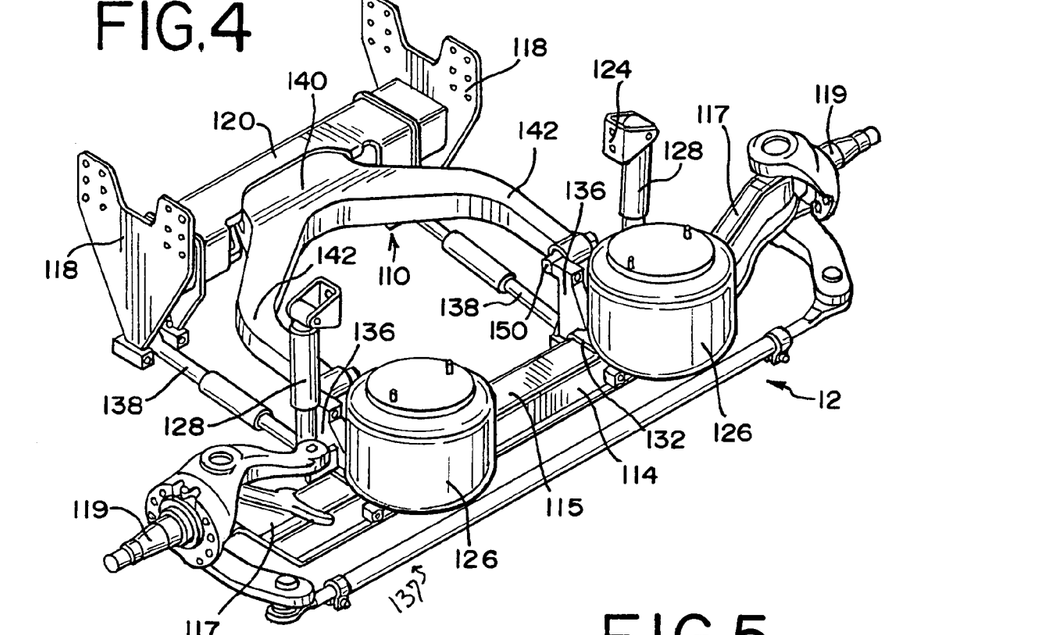
FIG. 4 is a perspective view of another suspension system designed in accordance with principles of the present invention.
Figure 5:
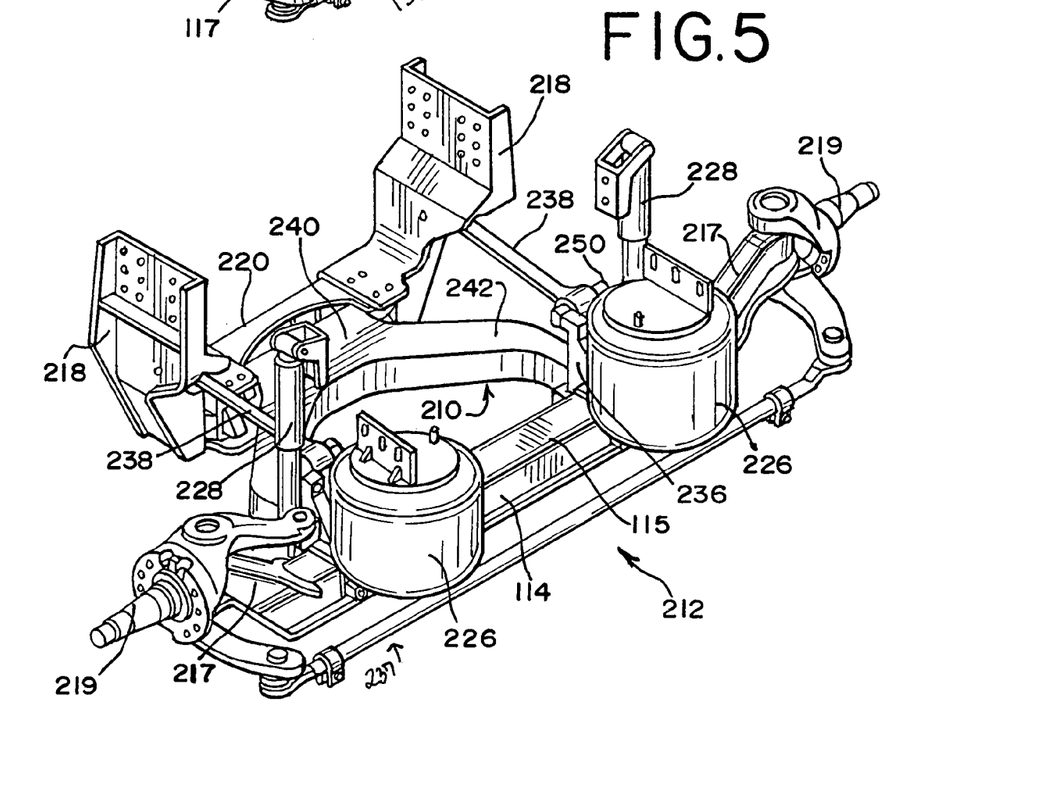
FIG. 5 is a perspective view of yet another suspension system designed in accordance with principles of the present invention.

In suspension system 12, the axle 14 is positioned ahead of wishbone-shaped-shaped linkage 10, i.e. the axle is closer to the front of the vehicle. A suspension system having this positioning of the axle relative to the wishbone-shaped linkage is characterized as having a leading arm configuration. On the other hand, suspension systems 112 and 212 as shown in FIGS. 4 and 5, respectively, have a trailing arm configuration. In the leading arm configuration of suspension system 12, there is space ahead of the axle and air springs for larger engine compartment components especially larger cooling systems.

The wishbone-shaped linkage 10 of suspension system 12 is pivotally attached to the axle 14 and cross member 20 at a low mount position. In other words, the entire wishbone-shaped linkage 10 is never located above the axle midsection 15. This arrangement is referred to as a low mount position. Preferably, in a low mount position, the wishbone-shaped linkage 10 is also positioned below torque rods 38. Suspension systems 212 and 312 shown in FIGS. 5 and 6, respectively, also have the wishbone-shaped linkage in a low mount position. Suspension system 112 shown in FIG. 4 has the wishbone-shaped linkage in a high mount position since the wishbone-shaped linkage 110 is pivotally connected to the axle 114 and cross member 114 with the wishbone-shaped linkage 114 being entirely above the axle midsection 115. Preferably, in a high mount position, the wishbone-shaped linkage 110 is also positioned above torque rods 138. These high or low mount positions affect the location of the roll center of the suspension system since the roll center is determined by the base of the wishbone-shaped linkage Suspension system 112 shown in FIG. 4 also connects the axle 114 to the frame members (not shown) and includes frame hangers 118, cross member 120, air springs 126, shock absorbers 128, torque rods 138 and four-point wishbone-shaped linkage 110. The primary difference between suspension system 12 (FIG. 1) and suspension system 112 (FIG. 4) is the placement of these components and the manner in which these components are connected to the axle, frame members and/or each other. In particular, suspension system 112 has a trailing arm configuration since the axle is behind or trails the wishbone-shaped link 110. In addition, suspension system 112 has the wishbone-shaped linkage 110 in a high mount position and is packaged with a standard draglink/tie-rod-configuration 137.

The high mount position of the wishbone-shaped linkage raises the roll center of the suspension system. In some instances, it may be desirable to raise the roll center so as to locate it near the center of gravity of the vehicle. Placing the roll center near or at the center of gravity improves vehicle stability and handling. However, packaging limitations need to be considered in such high mount positions. Consequently, vehicles that have high centers of gravity and have ample space around the steering axle because the engine is placed at the rear of the vehicle, such as recreational vehicles, are greatly benefited by high mount position suspension systems of the present invention since the roll center of the suspension is raised.

Shock absorbers 128 are pivotally connected to the frame members (not shown) and axle 114. The shock absorbers 128 are connected to the axle seat, and the shock absorber brackets 124 are attached to the frame members at a position other than directly above the axle 114. Air springs 126 are mounted to platforms (not shown) of axle seats 132 extending rearward of the axle 114, and consequently the air springs 126 and air spring mount brackets are located rearward of the axle 114.

Torque rods 138 are pivotally connected to the frame hangers 118 and axle 114, and wishbone-shaped linkage 110 is pivotally connected to cross member 120 and axle 114. The limbs 142 of wishbone-shaped linkage 110 are pivotally attached to arms 136 that upwardly and forwardly extend from the axle seat. Torque rods 138 are pivotally connected to the axle seat 132 at a relatively low position. It is to be understood however that the torque rods 138 can be connected to the axle 114 without the use of axle seat 132.

Arms 136 are modified to accommodate the pivotal attachment of limbs 142 using pins 150 that extend laterally through openings near the ends of limbs. In addition, since suspension system 112 has a trailing arm configuration, it is preferable to include compliant bushings (not shown) in the openings (not shown) near the ends of limbs 142 and which surround pins 150. The use of compliant bushings is preferred for trailing arm suspension systems because there is little risk of over-steer conditions and bushings may even improve handling by being tuned to react differently in different directions. This bushing and pin assembly is more clearly shown in FIGS. 2 and 3.

Just as in suspension system 12 (FIG. 1), the base 140 of wishbone-shaped linkage 110 is pivotally connected to the cross member 120, preferably through the use of a bushing and bar assembly as shown in FIGS. 2 and 3. Further, as is shown in FIGS. 2 and 3, a compliant bushing is preferably placed in the opening that extends through the base 40 and surrounds the bar 44. The bar is then pivotally connected to the cross member.

Suspension system 212 shown in FIG. 5 is nearly identical to suspension system 112. The main difference is that suspension system 212 has the wishbone-shaped linkage in a low mount position and wishbone-shaped linkage 210 is also positioned below torque rods 238. As with suspension system 112 (FIG. 4), suspension system 212 (FIG. 5) has a trailing arm configuration and is packaged with a standard draglink/tie-rod configuration 237. Consequently, limbs are pivotally attached to arms 236 using pin and bushing arrangement, as more clearly shown in the wishbone-shaped linkage of FIGS. 2 and 3. In addition, the base 240 of wishbone-shaped linkage 210 is pivotally connected to the cross member 220 using a bushing and bar assembly as shown in FIGS. 2 and 3. Preferably, a compliant bushing 45 is placed in the opening that extends through the base 40 and surrounds bar 44 as shown in FIGS. 2 and 3.

Suspension system 312 (FIG. 6) has a leading arm configuration since axle 314 is ahead of wishbone-shaped linkage 310. Suspension system 312 has a base-to-axle orientation. This base-to-axle orientation also utilizes a bar and bushing assembly 343. Wishbone-shaped linkage 310 has an opening that extends the along the base 340. Preferably, a compliant bushing is placed in the opening and surrounds and a bar 344. Bar 344 is then pivotally connected to the axle 314. In the wishbone-shaped linkage of FIGS. 2 and 3 there is shown in more detail a bar and bushing assembly 43 used to pivotally connect the wishbone-shaped linkage.

On the other end of wishbone-shaped linkage 310, limbs 342 are pivotally connected to cross member 320. Since the suspension system 312 has a leading arm configuration, the limbs 342 are pivotally connected to the cross member 320 without the use of compliant bushing. Preferably, each limb includes a pin 350 that extends laterally through an opening near the end of the limb and which is attached to the cross member 320 with a bolt or other fastener. In addition, there is preferably no bushing surrounding the pin 350 or alternatively a noncompliant bushing such as a metal sleeve surrounds the pin. Again bushings are preferably not used to avoid the possibility of over-steer effects prone to suspension systems having a leading arm configuration.

The decision of whether to configure the suspension system in any combination of a leading arm or trailing arm configuration, a high mount position or low mount position, and a base-to-axle connection or a base-to-cross member connection is dependent on several factors. The main factors are the packaging space limitations of the particular vehicle, the positioning of the desired roll center of the suspension system, and the steering kinematics desired.

The use of a four-point wishbone-shaped linkage in the suspension systems of the present invention preferably in combination with air springs, shock absorbers, cross bar member and two-force linkages, such as torque arms, provides significant improvements over prior art suspension systems utilizing leaf springs and other components such as air springs and stabilizer bars. Where these prior art suspension systems use four to five linkages to control the axle, suspension systems of the present invention use three linkages with the wishbone-shaped linkage performing multiple suspension functions.

In addition, the four-point wishbone-shaped linkages and suspension systems of the present invention allow for the addition of anti-dive features, tuning roll characteristics, compliance steering characteristics and increased axle travel. The bushing and bar assembly at the base of the wishbone-shaped linkage and the pin or pin and compliant bushing assembly at the limbs of the wishbone-shaped linkage allow for better tuning of axle roll since bushing stiffness is different in different directions.

In addition, the wishbone-shaped linkage of the present invention, when combined with air springs, shock absorbers and torque rods, reduces the weight, cost and complexity of prior art suspension systems utilizing leaf springs and an auxiliary roll stabilizer and privies the same ride comfort and handling characteristics within the same packaging constraints. Moreover, the large mouth or open area created by the limbs of the wishbone-shaped linkage and small footprint of the base of the wishbone-shaped linkage allows the placement of engine compartment components such as oil pans and sumps without interfering with axle travel. This makes suspension systems that include the wishbone-shaped linkage suitable for use with front steering vehicle axles.

Although the present invention has been described by reference to certain preferred embodiments, it should be understood that the preferred embodiments are merely illustrative of the principles of the present invention. Therefore, modifications and/or changes may be made by those skilled in the art without departing from the true spirit and scope of the invention as defined by the appended claims.

The invention claimed is:

1. A vehicle axle and axle suspension assembly for supporting a first longitudinally extending frame member on a first side of a chassis and a second longitudinally extending frame member on a second side of said chassis, said vehicle axle and axle suspension assembly comprising:

a laterally extending axle having first and second ends;

a first frame hanger mounted to said first frame member;

a second frame hanger mounted to said second frame member;

first and second axle seats mounted to said axle;

a cross member mounted to said first frame hanger and to said second frame hanger; and a wishbone-shaped linkage pivotally connected to said first and second axle seats and said cross member, wherein said first frame member is supported above a first end of said axle and said second frame member is supported above a second end of said axle.

2. The vehicle axle and axle suspension assembly of claim 1 wherein said wishbone-shaped linkage includes a base and first and second limbs, said base including a shaft extending laterally therethrough, said shaft includes a pair of ends and a compliant sleeve disposed around said shaft, said pair of ends pivotally connect said base to one of said first and second axle seats or cross member.

3. The vehicle axle and axle suspension assembly of claim 2 wherein said base has a lateral width W and a longitudinal length X, said first and second limbs extend longitudinally away from said base by length Z, said first and second limbs are laterally spaced from each other by width Y, said width Y is at least one and one-half as great as width W and said length Z is at least twice as great as length X.

4. The vehicle axle and axle suspension assembly of claim 3 further comprising a first air spring connected to said first frame member and axle and a second air spring connected to said second frame member and axle.

5. The vehicle axle and axle suspension assembly of claim 4 further comprising a first torque rod pivotally connected to said axle and said first hanger and a second control rod pivotally connected to said axle and said second hanger.

6. The vehicle axle and axle suspension assembly of claim 5 wherein each of said first and second limbs includes a fastener extending laterally therethrough for pivotally connecting said first and second limbs to said other of said first and second axle seats or cross member.

7. The vehicle axle and axle suspension assembly of claim 6 wherein said pair of ends pivotally connects said base to said cross member and said fasteners of first and second limbs pivotally connect said first and second limbs to said first and second axle seats.

8. The vehicle axle and axle suspension assembly of claim 7 wherein said axle is positioned closer to a front of said vehicle chassis than said cross member.

9. The vehicle axle and axle suspension assembly of claim 8 further including a noncompliant sleeve disposed around each of said fasteners.

10. The vehicle axle and axle suspension assembly of claim 9 wherein said first air spring is mounted to said first axle seat and said second air spring is mounted to said second axle seat.

11. The vehicle axle and axle suspension assembly of claim 10 wherein said first torque rod is pivotally mounted to said axle seat and said second torque rod is pivotally mounted to said second axle seat.

12. The vehicle axle and axle suspension assembly of claim 11 wherein said fastener of said first limb pivotally mounts said first limb to said first axle seat, and said fastener of said second limb pivotally mounts said second limb to said second axle seat.

13. The vehicle axle and axle suspension assembly of claim 12 further comprising a first shock absorber pivotally connected to said first frame member and said axle and a second shock absorber pivotally connected to said second frame member and said axle.

14. The vehicle axle and axle suspension assembly of claim 13 wherein said wishbone-shaped linkage is pivotally connected in a low mount position.

15. The vehicle axle and axle suspension assembly of claim 7 wherein said cross member is positioned closer to a front of said vehicle chassis than said axle.

16. The vehicle axle and axle suspension assembly of claim 15 further including a compliant sleeve disposed around each of said fasteners.

17. The vehicle axle and axle suspension assembly of claim 16 wherein said first air spring is mounted to said first axle seat and said second air spring is mounted to said second axle seat.

18. The vehicle axle and axle suspension assembly of claim 17 wherein said first torque rod is pivotally mounted to said axle seat and said second torque rod is pivotally mounted to said second axle seat.

19. The vehicle axle and axle suspension assembly of claim 18 wherein said fastener of first limb pivotally mounts said first limb to said first axle seat, and said fastener of said second limb pivotally mounts said second limb to said second axle seat.

20. The vehicle axle and axle suspension assembly of claim 19 further comprising a first shock absorber pivotally connected to said first frame member and said steering axle and a second shock absorber pivotally connected to said second frame member and said steering axle.

21. The vehicle axle and axle suspension assembly of claim 20 wherein said wishbone-shaped linkage is pivotally connected in a low mount position.

22. The vehicle axle and axle suspension assembly of claim 20 wherein said wishbone-shaped linkage is pivotally connected in a high mount position.

23. A suspension system for supporting a vehicle chassis having a first longitudinally extending frame member on a first side of said chassis and above a first end of an axle and a second longitudinally extending frame member on a second side of said vehicle chassis and above a second end of said axle, said suspension system comprising:

a first hanger mounted to said first frame member;

a second frame hanger mounted to said second frame member;

a cross member mounted to said first and second frame hangers;

first and second axle seats mounted to said axle; and a wishbone-shaped linkage pivotally connected to said cross member and said first and second axle seats.

24. The suspension system of claim 23 wherein said wishbone-shaped linkage includes a base and first and second limbs extending longitudinally and laterally away from said base.

25. The suspension system of claim 24 wherein said base has a lateral width W and a longitudinal length X, said first and second limbs extend longitudinally away from said base by length Z, said first and second limbs are laterally spaced from each other by width Y, said width Y is at least one and one-half as great as width W and said length Z is at least twice as great as length X.

26. The suspension system of claim 25 further comprising a first air spring connected to said first frame member and said axle and a second air spring connected to said second frame member and said axle.

27. The suspension system of claim 26 further comprising a first torque rod pivotally connected to said axle and said first hanger and a second torque rod pivotally connected to said axle and said second hanger.

28. The suspension system of claim 27 wherein said base includes a shaft extending laterally therethrough for pivotally connecting said base to one of said first and second axle seats or cross member, said shaft includes a pair of ends and a compliant sleeve disposed around said shaft.

29. The suspension system of claim 28 wherein said first limb includes a first fastener having a noncompliant sleeve disposed around said first fastener, said first fastener and first noncompliant sleeve extending laterally through said first limb near an end thereof and said second limb includes a second fastener having a noncompliant sleeve disposed around said second fastener, said second fastener and second noncompliant sleeve extending laterally through said second limb near an end thereof, said first and second fasteners pivotally mounting said first limb and second limb respectively to said other of said first and second axle seats or cross member.

30. The suspension system of claim 29 wherein said pair of ends pivotally connects said base to said cross member and said first and second fasteners of said first and second limbs pivotally connect said first and second limbs to said first and second axle seats.

31. The suspension system of claim 30 wherein said axle is positioned closer to a front of said vehicle chassis than said cross member.

32. The suspension system of claim 31 further including a noncompliant sleeve disposed about each of said first and second fastener.

33. The suspension system of claim 32 wherein said first air spring is mounted to said first axle seat and said second air spring is mounted to said second axle seat.

34. The suspension system of claim 33 wherein said first torque rod is pivotally mounted to said first axle seat and said second torque rod is pivotally mounted to said second axle seat.

35. The suspension system of claim 34 said first fastener pivotally mounts said first limb to said first axle seat and said second fastener pivotally mounts said second limb to said second axle seat.

36. The suspension system of claim 35 further comprising a first shock absorber pivotally connected to said first frame member and said axle and a second shock absorber pivotally connected to said second frame member and said axle.

37. The suspension system of claim 36 wherein said wishbone-shaped linkage is pivotally connected in a low mount position.

38. The suspension system of claim 30 wherein said cross member is positioned closer to a front of said vehicle chassis than said steering axle.

39. The suspension system of claim 38 further including a compliant sleeve disposed about each of said first and second fastener.

40. The suspension system of claim 39 wherein said first air spring is mounted to said first axle seat and said second air spring is mounted to said second axle seat.

41. The suspension system of claim 40 wherein said first torque rod is pivotally mounted to said first axle seat and said second torque rod is pivotally mounted to said second axle seat.

42. The suspension system of claim 41 said first fastener pivotally mounts said first limb to said first axle seat and said second fastener pivotally mounts said second limb to said second axle seat.

43. The suspension system of claim 42 further comprising a first shock absorber pivotally connected to said first frame member and said axle and a second shock absorber pivotally connected to said second frame member and said axle.

44. The suspension system of claim 43 wherein said wishbone-shaped linkage is pivotally connected in a high mount position.

45. The suspension system of claim 43 wherein said wishbone-shaped linkage is pivotally connected in a low mount position.

* * * * *